United States Patent [19]

Machaalani

[11] Patent Number: 4,950,165
[45] Date of Patent: Aug. 21, 1990

[54] EDUCATIONAL TOY BLOCKS

[76] Inventor: Joseph Machaalani, 8628 - 66th Avenue, Ottawa, Edmonton, Alberta, Canada, T6E 0L3

[21] Appl. No.: 350,729

[22] Filed: May 12, 1989

[30] Foreign Application Priority Data

Mar. 23, 1989 [CA] Canada .................................. 594592

[51] Int. Cl.⁵ .............................................. G09B 1/00
[52] U.S. Cl. ..................................... 434/159; 434/171
[58] Field of Search ........................... 446/75, 85, 124; 434/159, 170, 171, 259; 273/1 GE, 156, 157 R

[56] References Cited

U.S. PATENT DOCUMENTS

| | | | |
|---|---|---|---|
| 1,571,488 | 2/1926 | Moisan et al. | 434/170 X |
| 2,483,833 | 10/1949 | Levin | 434/159 |
| 3,420,527 | 1/1969 | Morin | 446/85 X |
| 3,760,511 | 9/1973 | Matsumoto | 434/259 |
| 3,898,761 | 8/1975 | Zohar | 446/85 |
| 4,422,642 | 12/1983 | Fletcher | 434/171 X |

*Primary Examiner*—Mickey Yu
*Attorney, Agent, or Firm*—Parks, Thompson & MacGregor

[57] ABSTRACT

An educational toy for children including a number of specially shaped blocks designed to be arranged in a side by side relation within a container. Each block has information of an alpha-numeric nature in a particular series on one face and information of a different series on a second face. The toy, when assembled, displays the complete sequential information of the series in rows.

12 Claims, 2 Drawing Sheets

EDUCATIONAL TOY BLOCKS

This invention relates to a toy and, more particularly, to an educational toy for children.

Children of all ages have long been amused by toy blocks and, as is well known, blocks of a variety of sizes and shapes are readily available. These blocks normally are cubic in shape and carry on the six sides thereof some information or pictures specifically designed to amuse small children. Because of the limited educational value in these types of blocks, they are of interest only to relatively young children.

The present invention provides an entertaining yet educational toy which stimulates growth in number and letter recognition skills in young children, teaches them to recognize and compare colours and provides a test of their dexterity. The toy, according to the present invention, also appeals to older childern inasmuch as its assembly tests an individual's memory and dexterity.

The invention, according to the present invention, comprises a plurality of blocks adapted to be removably arranged within a container. Each of the blocks has a first side including thereon indicia, according to a first series, and a second side having thereon, indicia of a second series wherein the blocks may be arranged in sequence in the container in accordance with one of the first or second series.

The preferred embodiment of the invention will now be described in greater detail with reference to the appended drawings wherein.

Figure 1:
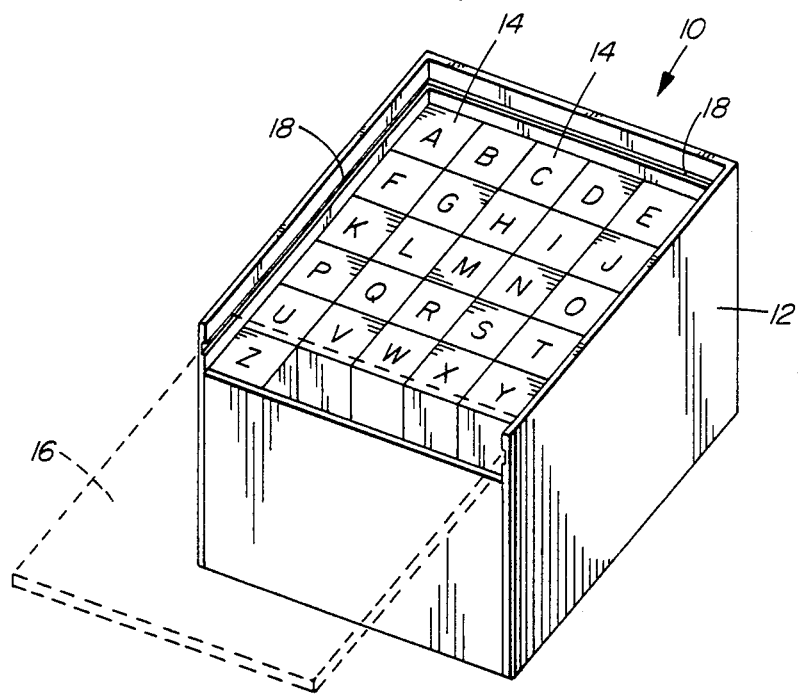
FIG. 1 is a perspective view of the container and assembled blocks.

With reference to FIG. 1, there is illustrated the educational toy generally designated 10 which includes a container 12 adapted to receive therein a plurality of blocks 14. Container 12, in accordance with a preferred embodiment, has inside dimensions of 6¼ inches by 6¼ inches and outside dimensions of approximately 6½ inches by 6½ inches. The container is approximately 3½ inches high. The distance between the top of the container and the surface which supports blocks 14 is approximately 2½ inches which provides room for the blocks which are 2 inches high and a space for a cover. These dimensions, however, are consistent only with the block size which will be described hereinafter. It is to be understood, of course, that the container is not limited to the sizes identified above, but may vary as required in order to accommodate different sized blocks. The container 12 is provided with a cover 16 shown in phantom which may be set within the container and slide in channels 18 formed in side walls. The cover may also be arranged with hinge means, not shown, on one side so that it may be opened in the usual manner. Latch means, not shown, will, of course, be attached on the opposite side to secure the cover in place when closed. The box or container 12 may be formed of suitable wooden material, or produced from plastics by known molding techniques.

Figure 2:
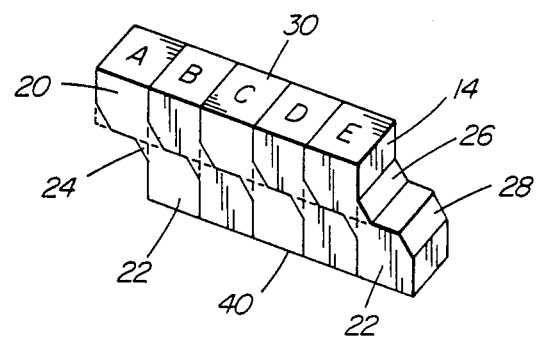
FIG. 2 is a side view of a single row of blocks.
Figure 3:
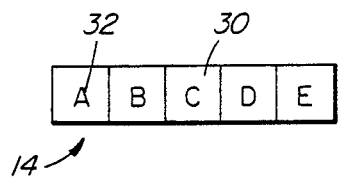
FIG. 3 is a top view of a row of blocks showing a grouping of a first series.
Figure 4:
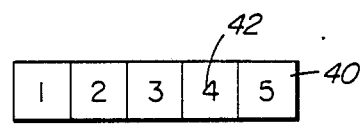
FIG. 4 is a top view of a row of blocks showing a grouping of a second series.

Blocks 14 in accordance with the preferred embodiment and as shown in FIGS. 2, 3 and 4 are designed in a specific shape. The blocks as illustrated have a first section 20 and a second section 22. Each block 14 is a cube and when viewed in cross section comprises essentially two square members offset as shown in dotted line in FIG. 2. The solid line in FIG. 2 shows the actual cross sectional shape of the block having shoulders 26 and 28. Connecting arm 24 joins the blocks in an offset relationship. Looking at the blocks from the top or bottom, the face is square as best seen in FIGS. 3 and 4. It will be noted in these figures that the blocks rest one beside the other in a nested relationship.

As illustrated in FIG. 3, the top 30 of each block is provided with indicia 32 in a series such as the alphabet. Referring to FIG. 1, it will be noted that the container 12 is of a size which accommodates five blocks 14 in a nested row. In this case, the top of each block is one inch by one inch, and because of the aforementioned offset, the total length of a row of five blocks is six inches. The applicant has found that the additional one quarter inch in the inside dimension of the box allows for children to easily manipulate the blocks so as to get them in and out of the container 12. In the preferred embodiment, the first side or top 30 contains letters of the alphabet which, as shown here in an assembled mode, represent the letters A, B, C, D and E. In the preferred embodiment, all blocks in the first row are of an identical colour. Similarly, blocks which fit into the next row will all have the same color, but different than the colour of the first row. The second row will contain blocks having the letters F, G, H, I and J. Blocks in each of the remaining rows will be of the same colour, but different from the colour of the blocks in the other rows.

The second side 40 of the block 14 as shown in FIG. 4 will include indicia 42 of a second series such as numbers 1, 2, 3, 4, 5 etc. As in the previous case, blocks bearing numbers 1, 2, 3, 4 and 5 will be of he same colour and the same as the colour of the blocks having indicia A, B, C, D and E.

The container 12, as illustrated, includes blocks of each of the twenty six letters of the alphabet arranged in the format illustrated in FIG. 1. As in the previous case, blocks in each row will be of the same colour, but different from the blocks of the other rows. In this way, there will be six groups of coloured blocks each having a sequential grouping of first and second series of indicia.

Figure 5:
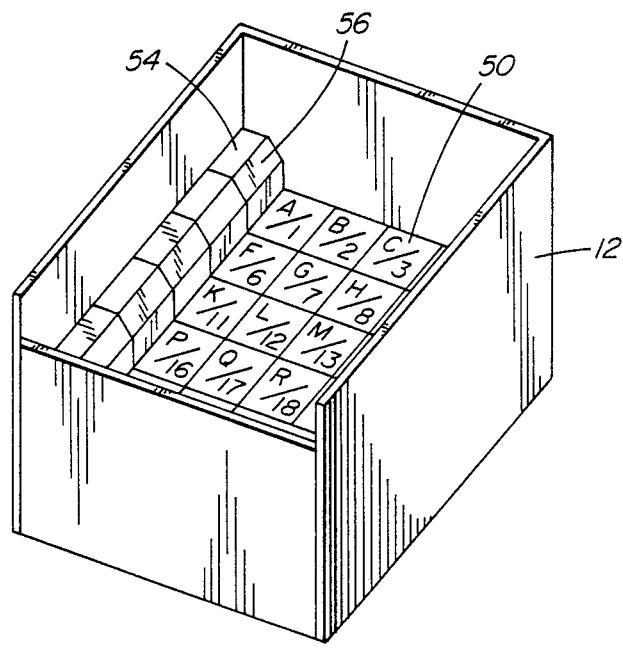
FIG. 5 is a perspective view of the container without the blocks therein.

The container 12 as illustrated in FIGS. 1 and 5 is designed to accommodate blocks 14 in a 5×6 matrix for a maximum total of 30 blocks. This is a sufficient number to contain, for example, the Arabic alphabet which has 28 letters. If other series of numbers or letters are to be included, the size or shape of the container may be altered as required.

The container 12, as best seen in FIG. 5, has painted or otherwise marked on the inside bottom surface rows 50 of identical colour to the rows of blocks which are intended to be assembled thereon. The markings 50 on the bottom face may further include an indication as to which of the blocks of either the first or second series is to be situated on that location.

It will be readily apparent that the blocks 14 can be assembled in either of two orientations only in order to properly fit within the container 12. It is to be understood, however, that the shape of the blocks shown in the illustrations represents the preferred embodiment, while blocks having different shapes may be used. For example, the blocks may be of a cubic construction having the indicia on the top and bottom faces.

As indicated before, the blocks 14, in accordance with the preferred embodiment are comprised of substantially two 1 inch cubes 20, 22 connected along a common edge at 24. The size of the block may, of course, vary from the 1 inch preferred embodiment to as small as ¼ inch per cube to as large as 5 to 6 inches per cube. As indicated previously, the size of the container 12 nust, of course, be varied in order to accommodate the blocks in each row.

The blocks 14 may be constructed from wood or formed from plastic material in accordance with known molding techniques. The numbers, letters or other indicia are applied to wooden blocks by stamping, stenciling or other similar means. The indicia are applied to blocks made of plastic by marking the information on paper or like material and applying the paper to the appropriate face of the blocks by adhesives, etc.

FIG. 5 also illustrates strip 54 located along the bottom and adjacent the end at which each row begins. This strip in the described emodiment is 1 inch high and 1 inch wide with a bevelled edge 56. Bevelled edge 56 is arranged to accommodate a section of connecting arm 24 so that the block may rest flush against the end of the container.

It will be apparent from the foregoing that this toy requires the child to first of all recognize the particular shape of the block and figure out the manner in which the blocks nest in a side by side relationship. The child is also taught to recognize colours in order to place blocks of the same colour in a row. The container having a marked row of the same colour serves as a further guide to the child in recognizing the appropriate colour. Even if the child is unable to recognize the indicia appearing on the first or second side, there is educational value in merely placing blocks of identical colour in each row. After the child has learned to successfully place blocks of identical colour in each row, he or she will begin to recognize the significance of indicia on the first or second side of each row. They will soon learn to identify the indicia of the series which is visible when the toy is properly assembled and will thus learn, for example, the alphabet. Conversely, if the indicia of the second series is displayed, they will learn their number sequences.

The toy, according to this invention, may also be used as a skill testing apparatus in that the contents of the container may be spread or spilled onto a plain surface and the time taken by the participant to assemble all of the blocks in a first or second series within the container is recorded. Thus, the child will be encouraged to learn the alphabet or numbers in order to improve time taken to reassemble the toy in one of the two available series.

In a further embodiment of the invention, a timer (not shown) is integrated into the container to provide an indication of elapsed time or to signify the completion of a preset time period. One such example is a miniature music generating device having a built in timer. The device is activated upon commencement of the test and it will play continuously for a set period, say 2 or 4 minutes, and the participant attempts to complete the assembly before the music stops.

Although the illustrations herein show the conventional alphabet and number systems, it is to be understood that the indicia may, for example, be in Roman numerals or in other forms if the alphabet, such as Arabic.

Although a preferred embodiment of the invention has been described and illustrated, it will be understood that the invention is capable of modification and variation and is limited only by the scope of the following claims.

The embodiments of the invention in which an exclusive property or privilege is claimed are defined as follows:

1. An educational toy comprising a container and a plurality of blocks adapted to be removably arranged in rows within said container; said container having a bottom and side walls; each of said blocks having a first, substantially cubic member including a top face, sides and a bottom; and a second, substantially cubic member including a top face, sides and a bottom; the bottom of said first member and the bottom of said second member being joined by an interconnecting member such that said first member is offset in one direction with respect to said second member, said top face of said first member having thereon indicia of a first sequential series and said top face of said second member having thereon indicia of a second sequential series, wherein said blocks may be placed in rows in said container thereby displaying sequentially said indicia of said first series of said indicia of said second series.

2. An educational toy according to claim 1 wherein said blocks are coloured such that when arranged in a first sequential series in rows in said container, the colour of said blocks in each row is the same but different than the colour of the blocks in the remaining rows.

3. An educational toy according to claim 2 wherein said container has on said bottom, coloured sections arranged in rows, the colour of each row corresponding to the colour of the blocks which are to be assembled in that row.

4. A toy according to claim 3 wherein said container has on said rows indicia according to the indicia of the first and second series of the blocks intended to be located on that row.

5. An educational toy according to claim 1 wherein said offset of said first member in one direction with respect to said second member permits assembly of said blocks in only one orientation within said rows.

6. A toy in accordance with claim 1 wherein said container has a removable cover.

7. The toy according to claim 1, wherein said indicia of said first series represents numbers.

8. The toy of claim 7 wherein said numerals are Arabic.

9. The toy of claim 7 wherein said numerals are Roman numerals.

10. The toy of claim 1, wherein said indicia of said second series is the alphabet.

11. The toy of claim 10 wherein said alphabet is Arabic.

12. The toy of claim 10 wherein said alphabet is Roman.

* * * * *